United States Patent [19]
Raghavan et al.

[11] Patent Number: 5,226,799
[45] Date of Patent: Jul. 13, 1993

[54] ULTRAHIGH PRESSURE POPPET VALVE WITH LOW WEAR

[75] Inventors: Chidambaram Raghavan, Kent; Olivier L. Tremoulet, Jr., Edmonds; Edmund Y. Ting, Kent, all of Wash.

[73] Assignee: Flow International Corporation, Kent, Wash.

[21] Appl. No.: 906,826

[22] Filed: Jun. 30, 1992

[51] Int. Cl.⁵ .................................... F16K 15/06
[52] U.S. Cl. ............................ 417/53; 137/1; 137/540; 417/569
[58] Field of Search ............. 137/540, 1; 251/333; 417/53, 569

[56] References Cited

U.S. PATENT DOCUMENTS

| | | |
|---|---|---|
| 1,514,233 | 11/1924 | Searles et al. |
| 1,671,140 | 5/1928 | Wilson |
| 1,781,771 | 11/1930 | Wilson |
| 3,219,311 | 11/1965 | Siver |
| 4,766,924 | 8/1988 | Lee ............... 137/540 X |
| 5,037,276 | 8/1991 | Tremoulet, Jr. |
| 5,037,277 | 8/1991 | Tan |

Primary Examiner—Robert G. Nilson
Attorney, Agent, or Firm—Hughes & Multer

[57] ABSTRACT

A low wear poppet valve in a high pressure reciprocating pump. Relative movement of the mating surfaces due to compressive distortion is eliminated. There is a valve seat having a flow passage and an upper mating surface, and a poppet element which sealingly abuts this. The flow passage is in communication with a low pressure zone, and the outer surfaces of the seat and element are in communication with a high pressure zone. The poppet element has a recess in its mating surface surrounded by a wall portion, and the low pressure zone is communicated from the flow passage into the interior of the recess. This enables the wall portion of the element to be displaced inwardly and outwardly in concert with the wall portion of the seat by the cyclic pressure differential which is generated between the zones by the operation of the pump. This eliminates relative movement between these parts which would otherwise cause fretting wear of their mating surfaces.

17 Claims, 10 Drawing Sheets

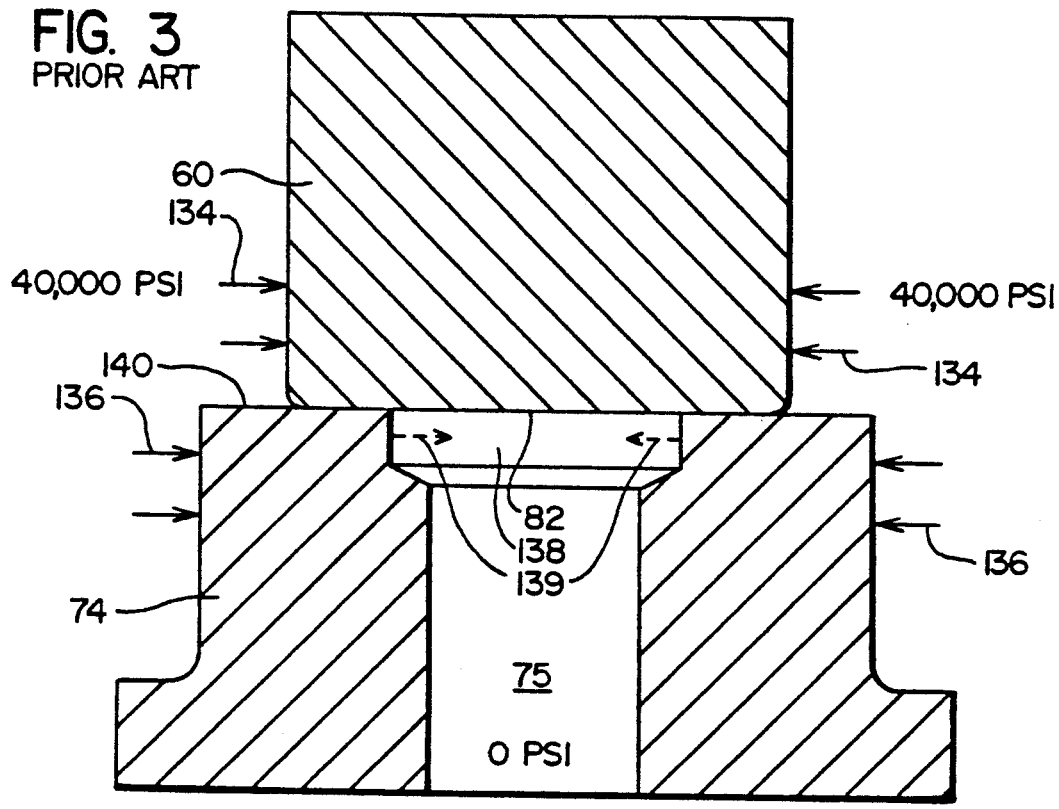
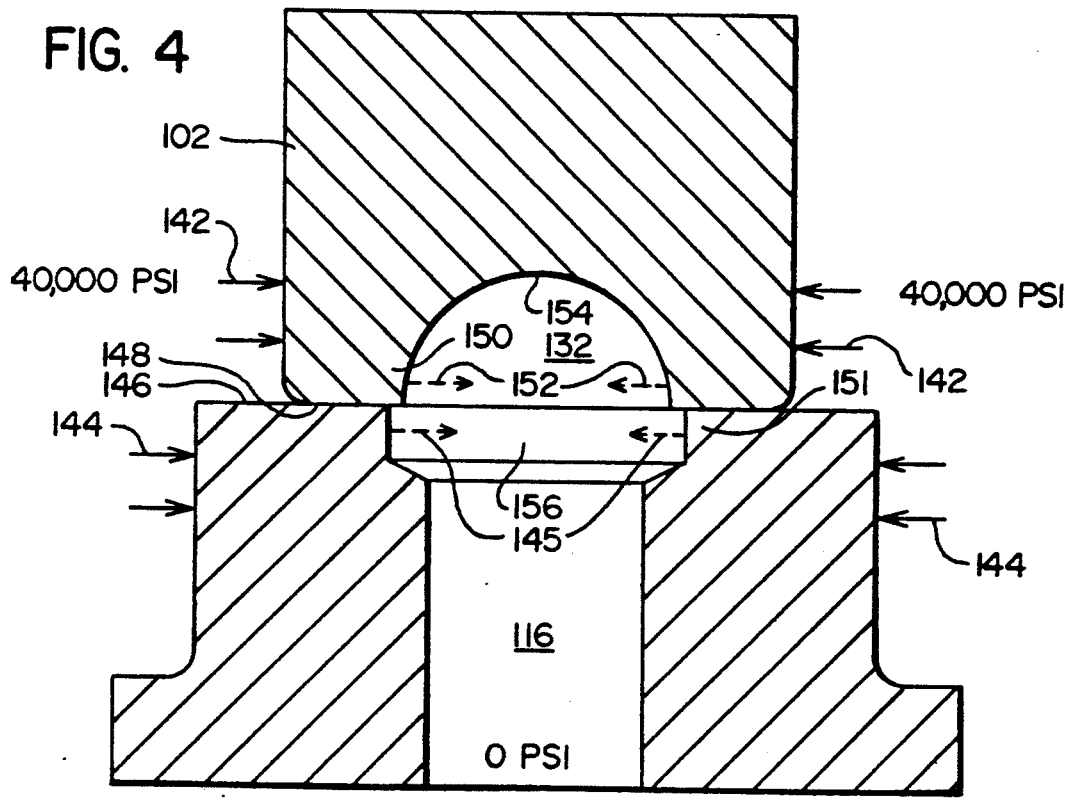

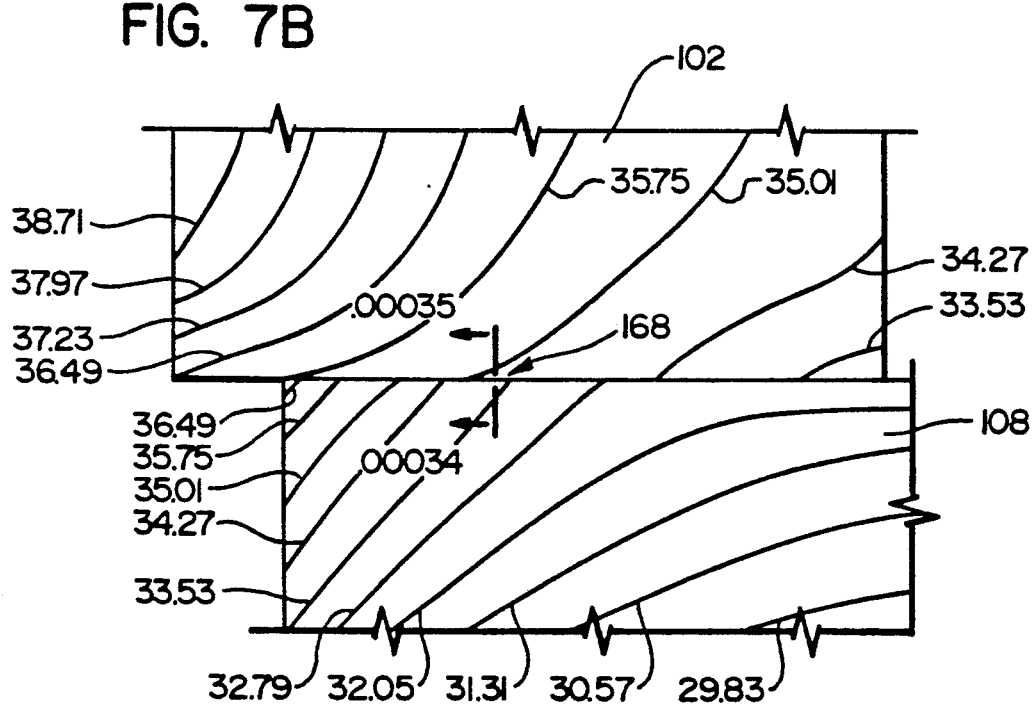

ULTRAHIGH PRESSURE POPPET VALVE WITH LOW WEAR

BACKGROUND OF THE INVENTION

1. Field of the Invention

The present invention relates to high pressure pumps, and more particularly to a poppet valve assembly incorporated in such pumps.

2. Background Art

There are various applications for high pressure pumps, one being to supply very high pressure fluid (e.g., water) so that this water may in turn be discharged in the form of a high velocity jet which can be used for cutting, abrading, etc. A common configuration for such a pump is to employ a reciprocating piston which operates in a high pressure cylinder to direct the fluid to a nozzle. On the pressure stroke, the plunger or other piston can generate pressures on the order of 25,000–40,000 PSI or more, while during the intake stroke the pressure in the cylinder drops to essentially nil.

An outlet check valve is positioned at the end of the pumping cylinder. Typical check valves used in this application include poppet valves, where the valve element has a transversely extending contact surface which fits against a matching contact surface of a valve seat. Poppet valves have generally proven satisfactory for these high pressure applications, but they exhibit a tendency to develop excessive wear, necessitating undesirable down time for repairs.

Before discussing the specifics of this problem, however, it is believed that a fuller appreciation will be gained by a review of a pump assembly having a conventional poppet valve of this type. FIG. 1 shows a system in which there is a pump assembly 10 having an end cap housing 16 mounted on the end of a cylinder housing. The cylinder housing is provided with a cylinder chamber in which the high pressure piston reciprocates. The poppet valve assembly 24 is mounted at the end of the cylinder chamber, and this is made up of a valve body 26 in which there is a central discharge passageway 28, and also several inlet passages 30 which are spaced radially therefrom. The discharge passageway 28 passes through poppet valve 32 into a high pressure valve chamber 34, and thence through an outlet opening 36 into an accumulator (shown schematically at 38). Typically, there are several such pumping assemblies which sequentially supply the accumulator 38 so as to sustain a constant supply of high pressure fluid; valve chamber 34 is thus constantly filled with very high pressure fluid, typically at 25–40,000 PSI or higher.

The poppet valve is made up of a cylindrical poppet element 60 mounted on the end of a guide 62 which reciprocates within a retaining cage 64. A compression spring 66 presses from an end wall 68 of the retaining cage against a shoulder 70 about the rear of the guide. The cage 64 is provided with openings 72 which permit fluid to flow around the poppet element 60 and out into chamber 34, and vents 73 are also provided to facilitate movement of the guide within the cage.

A cylindrical valve seat 74 is positioned within the base of cage 64. This has a central flow passage 75 which defines a continuous portion of outlet passageway 28. On the discharge stroke of the pumping cylinder, the pressure in passageway 28 lifts element 60 off seat 74, so that the fluid flows out into the valve chamber. Then, on the intake stroke, the pressure in passageway 28 drops off, and the poppet element 60 is forced into sealing abutment with seat 74 by compression spring 66 and the pressure in chamber 34; this seal prevents the high pressure fluid in the chamber from escaping back into the cylinder through passageway 28. The extreme pressure differential between chamber 34 and flow passage 75 during the intake stroke creates a very high interface stress between the poppet and seat, and this must be significantly higher than the fluid pressures to ensure that an effective metal-to-metal seal is established.

As noted above, rapid wear rates have been encountered in operation of these poppet valves. The wear has been observed to occur at the interface between the poppet element and the seat, where there is considerable erosion of material from both elements. Upon investigation, it has been found that this erosion stems not so much from the passage of fluid between these parts, but is instead mostly caused by relative movement between the element and seat. Specifically, the fluid in the chamber exerts a continuous compressive force against the exterior of the valve seat, this being communicated through a small annular space 78 between the seat and the socket 80 in which it is received, while the pressure in the central flow passage fluctuates with the strokes of the pumping piston. As a result, the annular wall of the seat is displaced inwardly by the pressure differential during the intake stroke, and then expands back outwardly during the discharge stroke. The poppet element, however, does not undergo the same cyclic deformation: as seen in FIG. 1, the conventional element 60 is a solid metallic component, and thus the pressure in chamber 34 is resisted by the non-fluctuating compressive strength of the solid body. As a result, considerable relative movement occurs between the mating surfaces of the seat and element while these are in engagement. This, combined with the high interface stress, leads to plastic deformation and fretting wear, which causes the valve to leak. Once the leaks begin, the wear rate accelerates and performance degenerates rapidly.

Accordingly, there exists a need for a poppet valve assembly for use with very high pressure reciprocating pumps which reduces or eliminates relative movement of the mating faces of the poppet element and valve seat while these are in engagement, so as to minimize wear during operation. Furthermore, there is a need for such an assembly which is economical to manufacture, and which is compatible with other components of existing types of such reciprocating pumps.

SUMMARY OF THE INVENTION

The present invention has solved the problems cited above, and is a low wear poppet assembly for a check valve which prevents reverse flow of fluid from a high pressure zone to a low pressure zone in a reciprocating pump. Broadly, the assembly comprises a valve seat having an upper mating surface and at least one flow passage for the fluid, the flow passage being bordered by a wall portion of the seat. The flow passage is in communication with the low pressure zone, and an outer surface of the wall portion is in communication with the high pressure zone so that the wall portion is displaced inwardly a predetermined amount in response to a pressure differential which is developed between these zones.

The poppet element has a lower mating surface configured to sealingly abut the mating surface of this seat so as to prevent the reverse flow of fluid. The poppet element has a recess which extends inwardly from the mating surface, and this is bordered by a wall portion of the element. The recess is continuous with the flow passage in the seat when the element and seat are in abutment, so that the recess is in communication with the low pressure zone, and an outer surface of the wall portion of the element is in communication with the high pressure zone so that the wall portion of the element is displaced inwardly a predetermined amount in response to the pressure differential. The recess is configured so that the amount which the wall portion of the poppet element is displaced inwardly is approximately equal to that which the wall portion of the seat is displaced inwardly where these meet, so as to minimize relative movement between the mating surfaces when in sealing abutment.

The valve seat may have a single flow passage, or a plurality of flow passages. Where there is a single flow passage, the poppet element may be substantially cylindrical, with a circular mouth opening located centrally in its lower mating surface so that the mating surface extends annularly about this. The seat, in turn, may also be cylindrical, with the flow passage being a cylindrical bore having a circular opening so that the upper mating surface extends annularly about this.

The upper end of the recess in the poppet element may be closed by a domed internal surface of the element so as to prevent concentration of stress along this surface as the wall portion of the element is displaced inwardly. This domed internal surface may be substantially hemispherical in shape, and there may also be a cylindrical lower portion which extends from the domed internal surface downwardly to the lower mating surface of the element.

Where there are a plurality of flow passages in the valve seat, this may be a doughnut-shaped member having a central opening for receiving a shank of a limit screw, with the flow passages being arranged in a radial array about this. The poppet element, in turn, may be a corresponding doughnut-shaped member having a central opening for the shank of the limit screw, the recess in the mating surface of the poppet element extending annularly about its central opening so as to be in alignment with the array of flow passages in the seat. The recess in the poppet element may be an annular groove which is formed in the mating surface of the element, and this may be U-shaped in cross section. The annular recess in the poppet element may be formed approximately midway between the central opening and the outer surface thereof, so that annularly spaced inner and outer wall portions of the element having approximately equal thicknesses are formed adjacent the annular recess.

There is also provided a method for minimizing wear of a poppet assembly of a check valve which prevents reverse flow of the fluid from a high pressure zone to a low pressure zone in a reciprocating pump by minimizing relative movement between the mating surfaces of the valve seat and poppet element when these are in sealing abutment.

BRIEF DESCRIPTION OF THE DRAWINGS

FIG. 3 is an enlarged sectional view of the solid poppet valve element of FIG. 1 and its associated valve seat;

FIG. 4 is an enlarged sectional view of the poppet element of the present invention, this being shown in sealing abutment with its associated valve seat;

FIG. 7B is an enlarged portion of the diagram of FIG. 7A, showing the interface area between the poppet element and seat;

DETAILED DESCRIPTION

Figure 1:
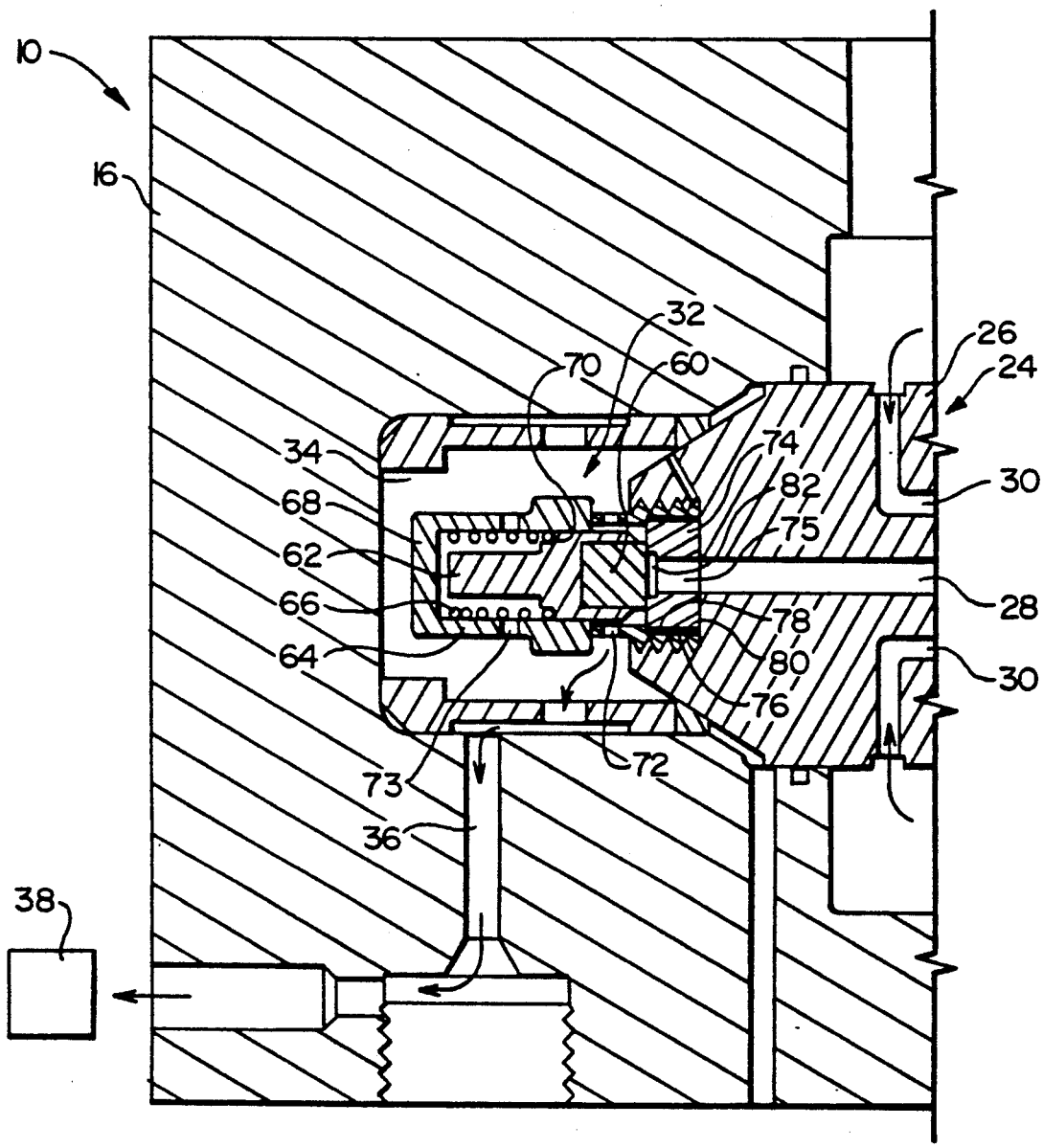
FIG. 1 is a sectional view of a poppet valve assembly having a conventional solid poppet element.
Figure 2:
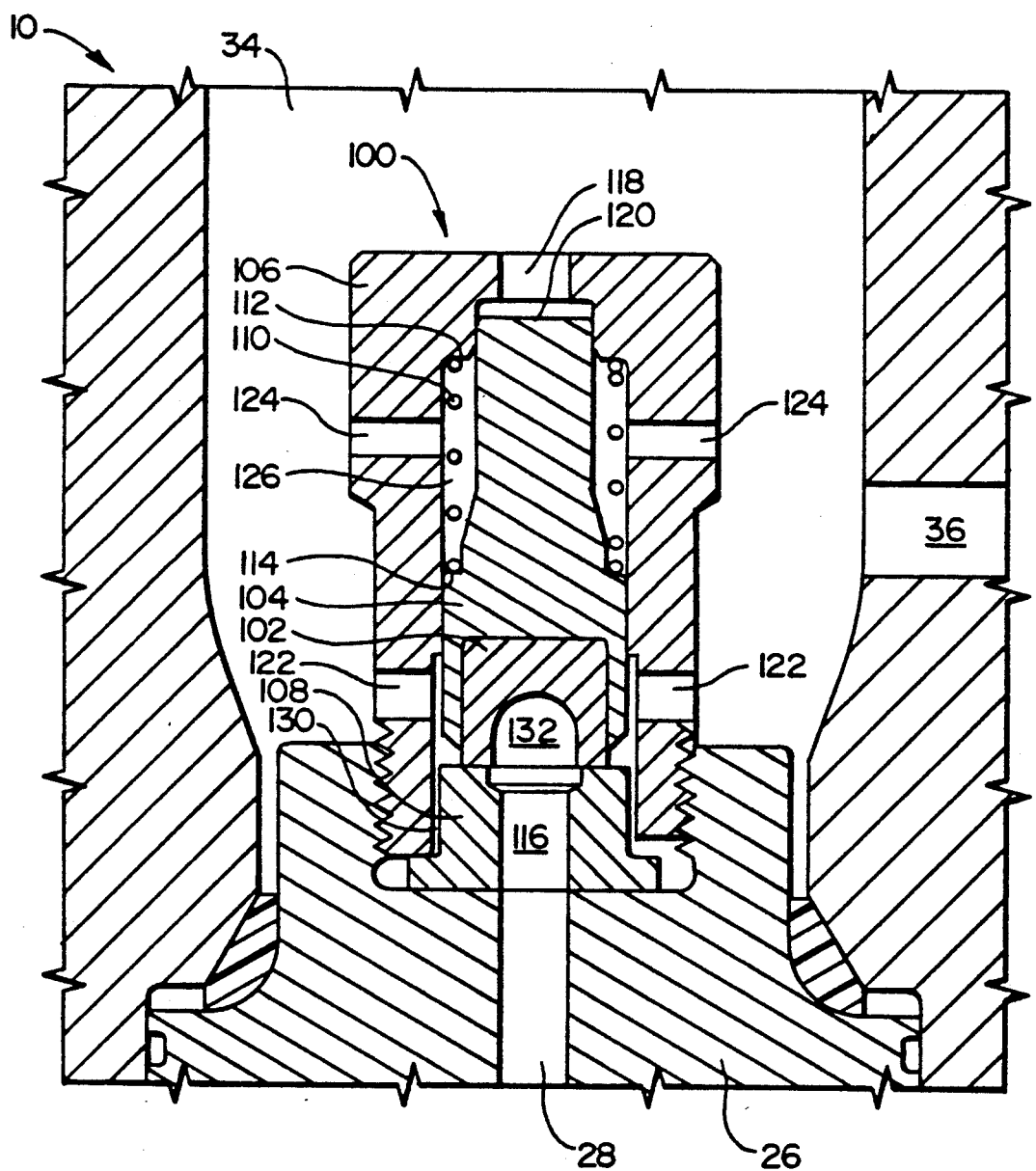
FIG. 2 is a sectional view of a poppet valve assembly somewhat similar in overall configuration to that of FIG. 1, this showing a poppet element in accordance with the present invention which is provided with a central recess which enables the mating surface of the element to deform inwardly and outwardly in concert with that of the valve seat so as to eliminate relative movement between the surfaces.
Figure 5:
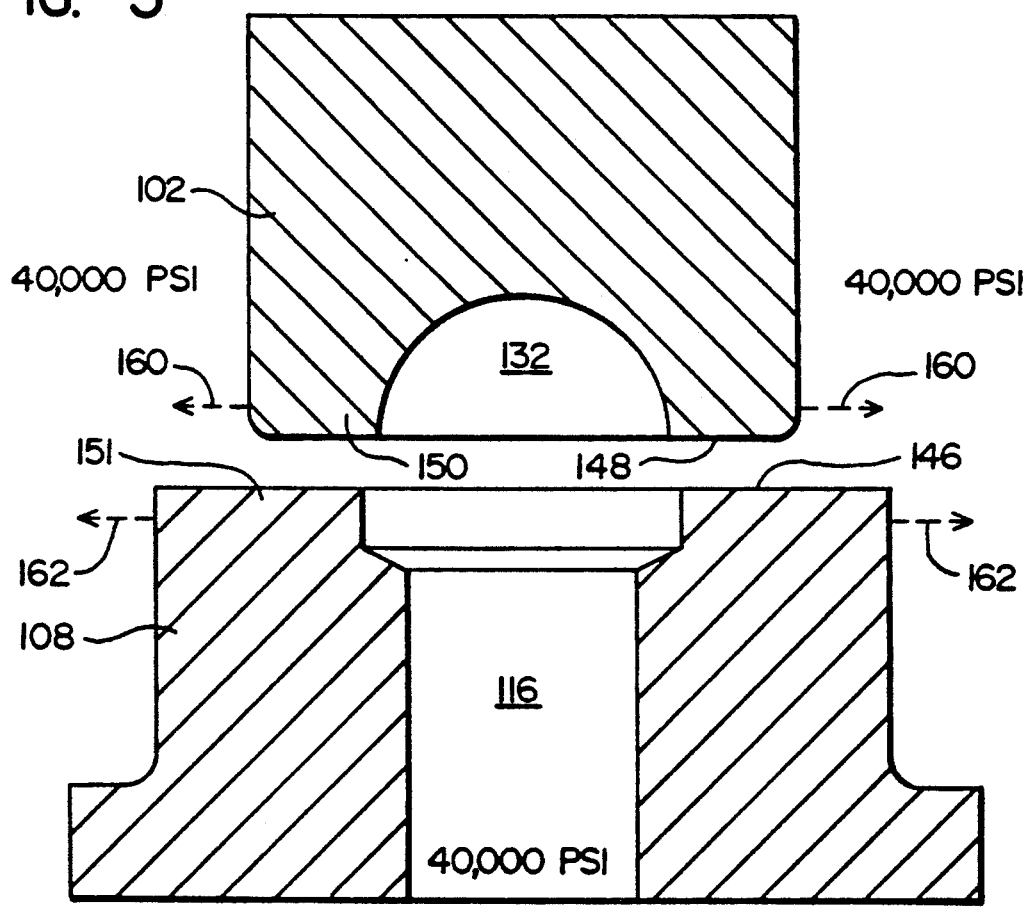
FIG. 5 is an enlarged sectional view similar to that of FIG. 4, showing the poppet element having been lifted off of the seat so as to permit the discharge of fluid.

FIG. 2 shows the poppet valve assembly 100 of the present invention mounted in a high pressure pump in place of the conventional poppet valve assembly described above. Inasmuch as the overall configuration of pump assembly 10 is similar to that described with reference to FIG. 1, like reference numerals will refer to like elements in these assemblies. Accordingly, high pressure fluid flows from the pumping cylinder into chamber 34, via poppet valve assembly 100.

The overall configuration of valve assembly 100 is somewhat similar to that described above, inasmuch as this is made up of a poppet element 102 set in a guide 104 which is mounted for reciprocating movement within a retaining cage 106. The element is again biased towards seat 108 by a compression spring 110, which abuts a shoulder 112 in the end of the cage and a shoulder 114 on the guide. As before, the poppet element 102 lifts off of seat 108 during the discharge stroke, and the fluid escapes through the radial ports 122 into chamber 34. The poppet element then closes the flow passage 116 in the seat during the intake stroke.

As previously discussed, the annular wall of seat 108 is deformed inwardly by the pressure differential which is created during the intake stroke, and this has formerly led to relative movement between the seat and poppet element; however, the poppet element of the present invention is provided with a central recess 132 which enables the end of the poppet element to deform inwardly simultaneously with the seat, thus eliminating the relative movement of these parts.

This is perhaps best illustrated by a comparison of FIG. 3, which shows the conventional solid poppet element, and FIG. 4, which shows the poppet valve element of the present invention. As can be seen in FIG. 3, the pressure in the valve chamber applies an inwardly directed force against both the poppet element 60 and seat 74, as indicated by arrows 134, 136 (in the interest of simplicity, only radially-directed forces are shown). This causes the inward deformation of the seat when the pressure in bore 75 is reduced during the intake stroke, as indicated by broken line arrows 139, but this is not accompanied by a corresponding deformation of the solid poppet element.

Turning to FIG. 4, this shows the poppet element of the present invention and its seat being subjected to essentially identical inwardly directed forces, as indicated by arrows 142 and 144. Seat 108 consequently deforms inwardly during the intake stroke in the same manner as before, as indicated by broken line arrows 145. In this case, however, the poppet element 60 is provided with recess 132, and this relieves material from the central portion of the poppet element so that a relatively thin annular wall 150 is formed about its periphery. The recess also permits the low pressure zone in the flow passage to be communicated into the interior of the poppet element, so that this wall portion is subjected to the same pressure differential as that of the seat. The wall of the poppet element is consequently displaced inwardly in concert with the wall of the valve seat during the intake stroke of the cylinder, as indicated by broken line arrows 152. Then, during the discharge stroke, the increased pressure within the flow passage of the valve seat is communicated to recess 132. As a result, the annular wall portion 150 of the poppet element and the corresponding annular wall portion 151 of the valve seat, being relieved of the pressure differential, expand back outwardly together as indicated by broken line arrows 160, 162.

Achieving this matched deformation of the seat and element depends primarily on the configuration of recess 132. As shown in FIG. 4, the recess is preferably aligned axially with the flow passage in the seat, and its diameter also corresponds generally to that of the flow passage. The lower end of the wall portion 150 extends around the circular opening of the recess, so that this forms an annular mating surface 148 which corresponds to the surface 146 of the seat. At its upper end, the recess is closed by a domed upper portion 154, so that the peripheral wall 150 is joined diametrically by a continuous, curved surface. This helps prevent concentration of stress as the wall flexes inwardly and outwardly, and also provides for a smooth transition from the deformable lower portion of the element to the solid, relatively non-deformable upper portion. In some embodiments, the recess may also have a cylindrical lower portion which extends from the domed upper end down to the lower mating surface, and this may be seen in FIG. 2; this arrangement provides for an annular wall having a constant thickness over at least a portion of its height, and also makes it possible to provide the recess with greater height than would be possible using a hemispherical opening alone.

From the foregoing, it will be understood that the central aspect of the present invention is that the poppet element is formed with a central recess such that its mating surface deflects inwardly and outwardly in concert with that of the valve seat. The success of this arrangement is clearly borne out by a comparison of FIGS. 6A-B, which show the displacement contours of the conventional, solid poppet element and valve seat, with FIGS. 7A-B, which show the corresponding contours for the poppet element and valve seat of the present invention. Each of the views represents the right-hand half of the respective assembly, and so the displacement takes place generally to the left. These deflection contours were obtained using finite element analysis, and were generated assuming a pressure differential of approximately 40,000 PSI across these components. The numerical values associated with the contour lines represent the distances which these parts of the members are displaced due to the pressure differential, these figures being in units of $1 \times 10^{-5}$ inches (e.g., 28.42 = 0.0002842 inches).

Figure 6A:
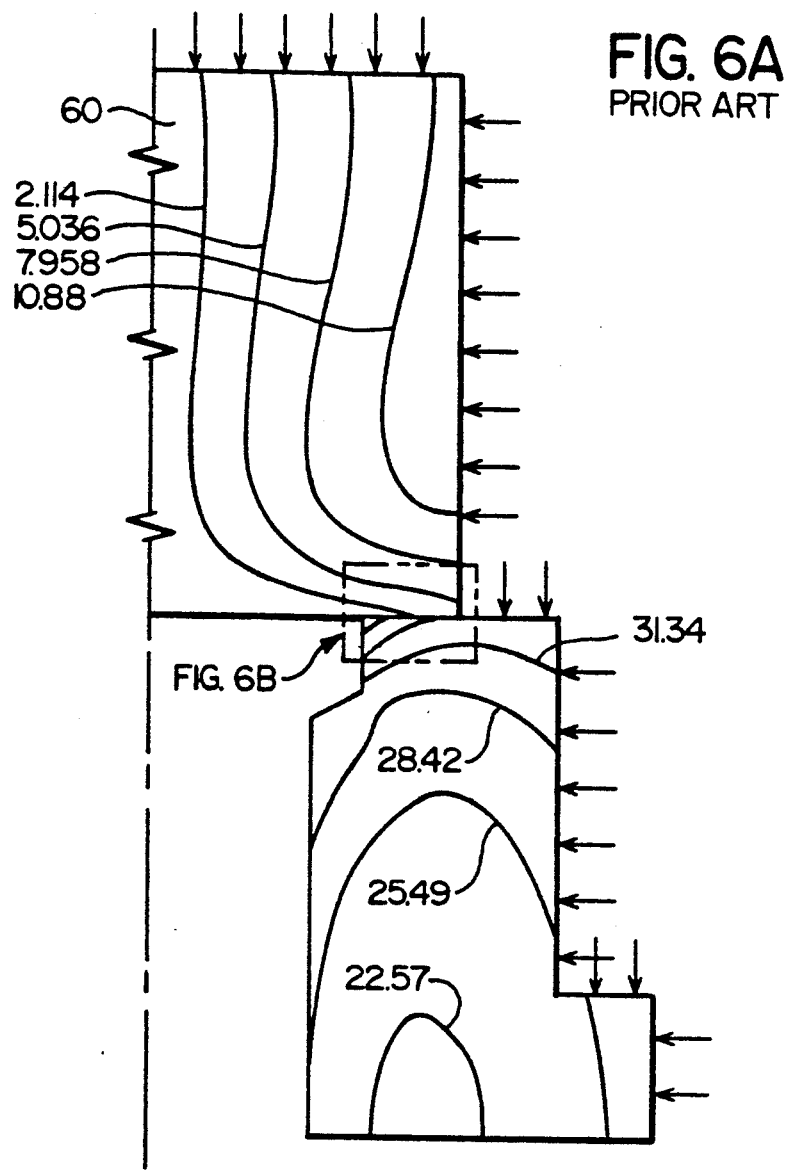
FIG. 6A is a displacement contour diagram representing the displacement undergone by the conventional, solid poppet element and its seat during the operation of this assembly, this view corresponding to the right-hand half of the element and seat shown in FIG. 3.

The contours shown in FIG. 6A clearly show the large degree of relative movement which occurs between the solid poppet element and its valve seat. While some slight deformation of the solid poppet element may be observed, this is very small, and varies from approximately 0.00011 inches downwardly to 0.00002 inches and less. By contrast, the valve seat wall is displaced by much greater distances, and these range from a minimum of about 0.00022 inches to in excess of 0.00037 inches.

Figure 6B:
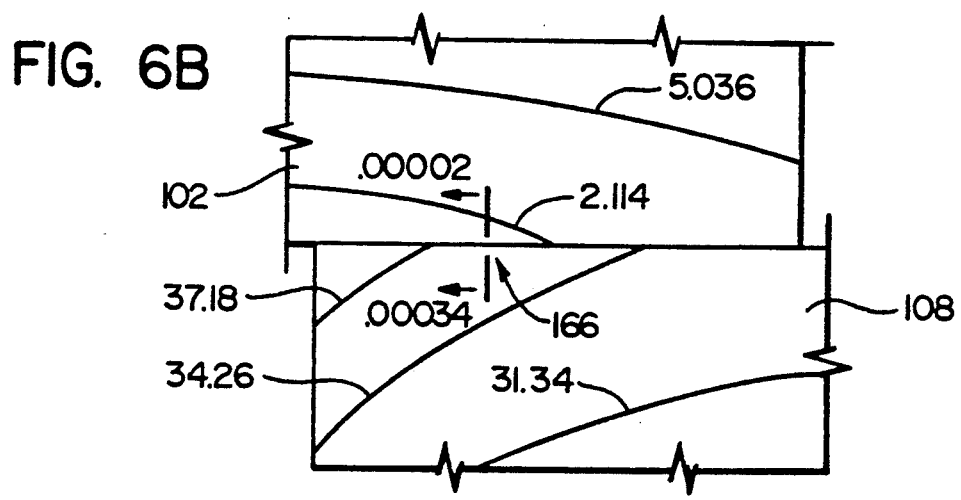
FIG. 6B is an enlarged portion of the diagram of FIG. 6A, showing the interface area between the poppet element and seat.

This disparity is particularly pronounced at the sealing interface, as shown in FIG. 6B. At an exemplary point 166, which is roughly the midpoint of the annular sealing area formed between the poppet element and seat, the surface of the solid poppet element is displaced inwardly by only 0.00002 inches, while the corresponding portion of the valve seat is displaced by 0.00034 inches. Therefore, a relative movement of 0.00032 inches—inwardly and then back outwardly—occurs during each stroke of the pumping cylinder, precipitating the wear described above.

Figure 7A:
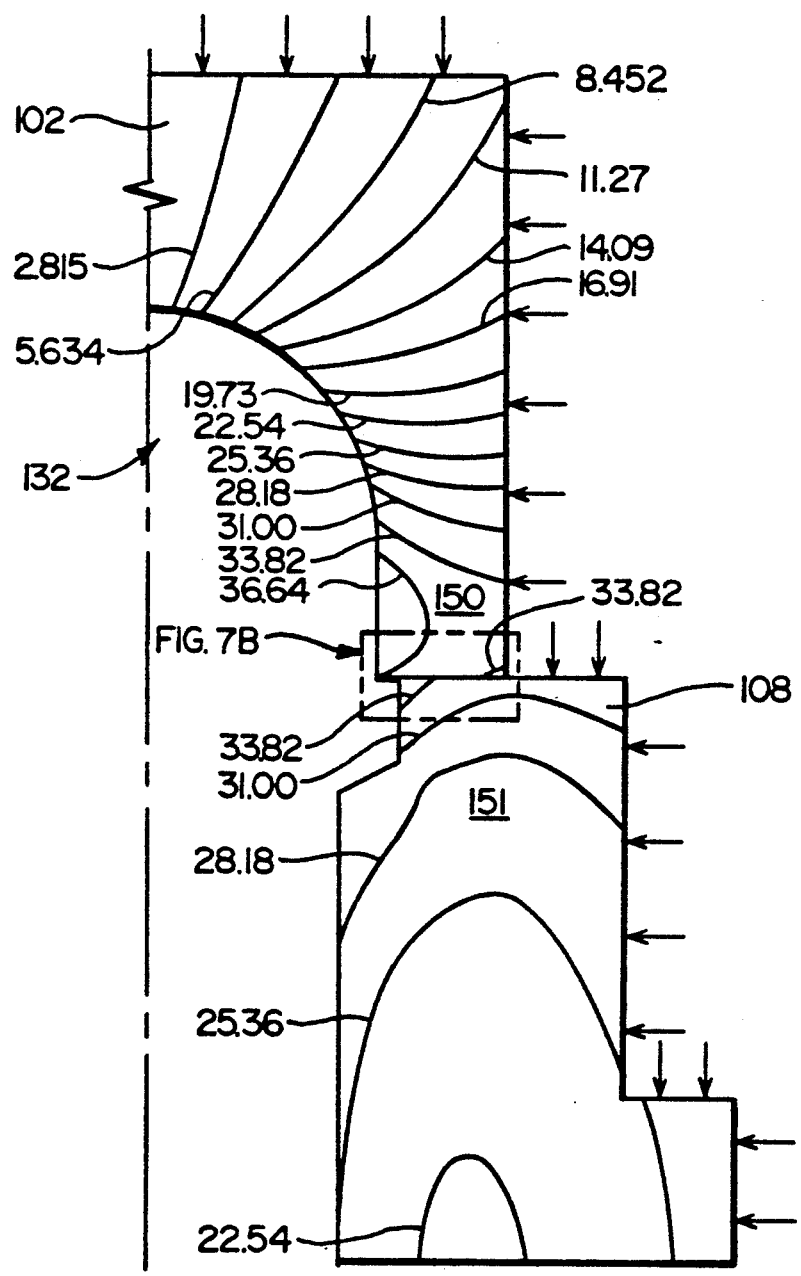
FIG. 7A is a displacement contour diagram similar to that of FIG. 6A, this showing the displacement undergone by the hollowed out poppet element of the present invention and its seat during operation of this assembly, this view corresponding to the right-hand half of the element and seat shown in FIG. 4.
Figure 8:
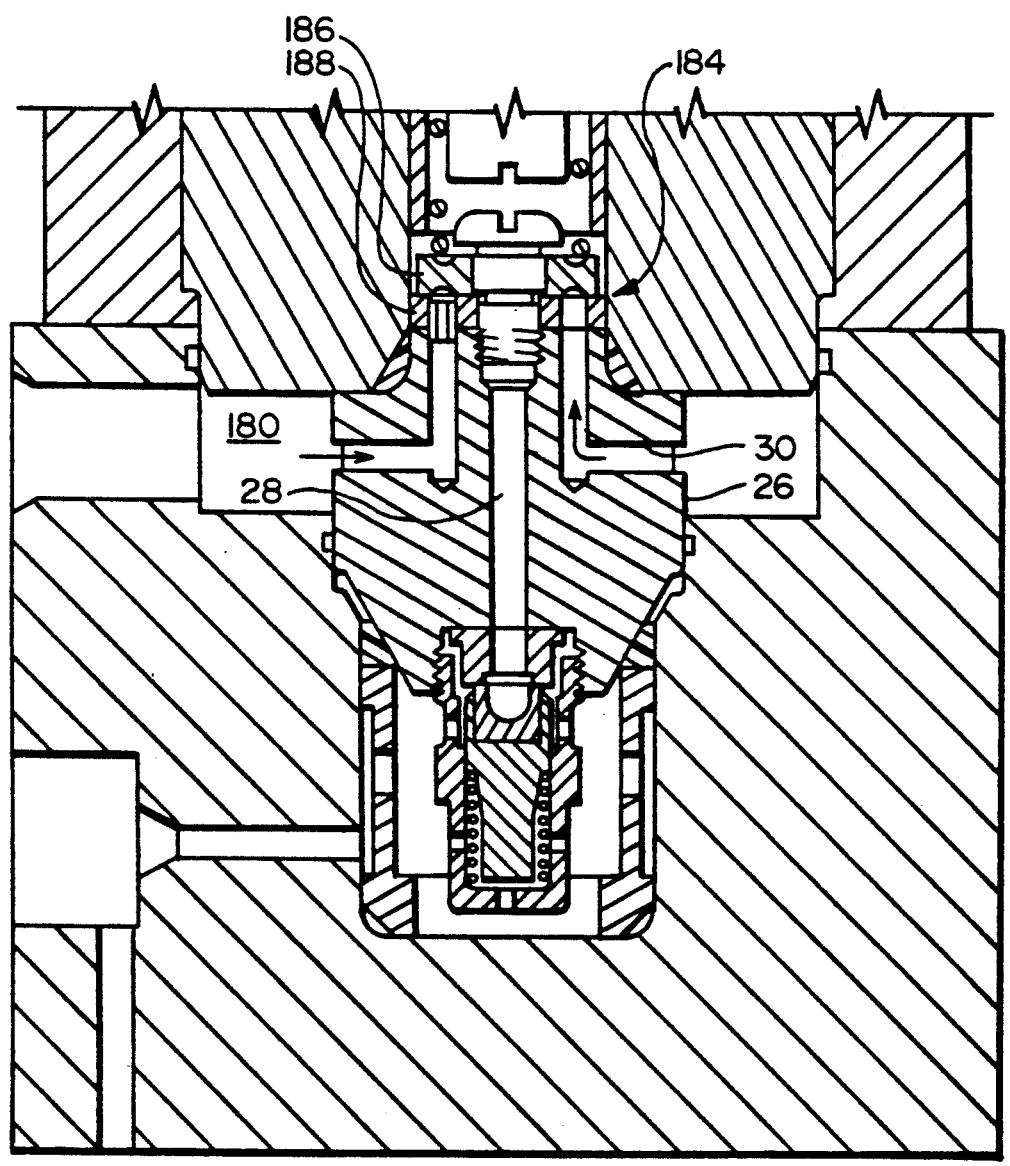
FIG. 8 is a sectional view somewhat similar to that of FIG. 2, this showing an inlet poppet valve in accordance with the present invention.

FIGS. 7A-7B, in turn, illustrate the dramatic reduction in relative movement which is achieved with the hollowed out poppet element of the present invention. The deflection of the annular wall portion of this element is clearly visible in FIG. 7A, where it will be seen that the displacement toward the bottom of the wall exceeds 0.00036 inches, this being several times greater than that exhibited by the corresponding portion of the solid poppet element. However, what is critical is not the mere deflection of the poppet element, but rather that this deflection be matched to the deflection of the wall portion of the seat. This is achieved by correct dimensioning of recess 132, principally in terms of depth and diameter, and the results are clearly shown in FIG. 7A: there is a smooth and continuous transition from relatively little displacement at the upper end of the poppet element, to about 0.00034 inches inward displacement at the interface with the valve seat. The contours for the wall portion of the valve seat 108, in turn, show that the mating surface of the valve seat is again displaced inwardly by about 0.00034 inches, and that this now very closely matches the displacement of the mating surface of the poppet element. Progressing downwardly along the seat, the displacement contours smoothly taper off to lesser values; in essence, the displacement of the valve seat 108 "mirrors" that of the poppet element 102, with the two being deflected inwardly to the greatest extent at their engaged surfaces, and then to a lesser degree as one moves away from this interface.

The virtual elimination of relative movement at the sealing interface is confirmed by an examination of the enlarged view of FIG. 7B. This again shows the progression of increasing displacement values toward the lower end of the poppet element, and how these closely correspond to the contours for the valve seat where the two meet. In fact, at point 168, which corresponds in location to point 166 in FIG. 6B, the respective displacement figures are now very closely matched at 0.00035 inches and 0.00034 inches. The relative movement at this point has thus dropped to about 0.00001 inches, this being about a thirty-fold reduction from the 0.00032 inches of movement which was experienced with the conventional design, and this results in a correspondingly dramatic decrease in wear.

The exemplary results illustrated above were achieved with a poppet element and valve seat having the following relevant dimensions:

| Poppet Element | |
|---|---|
| Overall Diameter | .400" |
| Overall Height | .350" |
| Diameter of Recess Opening | .234" |
| Depth of Recess | .20" |
| Curvature of Hemispherical Upper End of Recess | .117" SR |
| Valve Seat | |
| Outside Diameter of Wall Portion | .557" |
| Height of Wall above base | .245" |
| Diameter of flow passage | .188" |
| Diameter of Mouth (65° transition to central bore) | .260" |
| Depth of Mouth | .050" |

The exemplary elements were formed of Carpenter stainless steel, type 410, these being heat treated at 1800° F., and oil quench tempered at 550° F. for four hours prior to machining. Of course, many modifications to these exemplary embodiments, in terms of both geometries and materials, will occur to those skilled in the art. For example, a relatively thicker annular wall portion which demonstrates a similar degree of displacement can be provided by decreasing the diameter of the recess while increasing its height, and vice versa.

With reference now to FIGS. 8–11, a second embodiment of the present invention will now be described, this being an intake valve assembly for controlling the flow of low pressure fluid into the pumping cylinder. Turning then to FIG. 8, this again shows the valve body 26 which is mounted at the end of the cylinder chamber, and that this has several radially spaced inlet passages 30. These inlet passages communicate with a manifold 180 which provides a supply of low pressure fluid. Typically, this low pressure fluid is water, and the supply pressure may commonly be about 60 PSI. The low pressure water is drawn into the pumping cylinder through the inlet passages 30, in the direction indicated by the arrows in FIG. 8. This flow is controlled by an inlet check valve, this being provided by poppet valve assembly 184. The valve assembly is made up of a doughnut-shaped poppet element 186 and a correspondingly doughnut-shaped valve seat 188. During the intake stroke of the pump, the poppet element 186 is lifted off of seat 188 so as to permit the low pressure fluid to flow into the pumping cylinder, and then during discharge stroke, the poppet element moves back into sealing abutment with the seat so as to prevent reverse flow of pressurized fluid back through passages 30.

Figure 9:
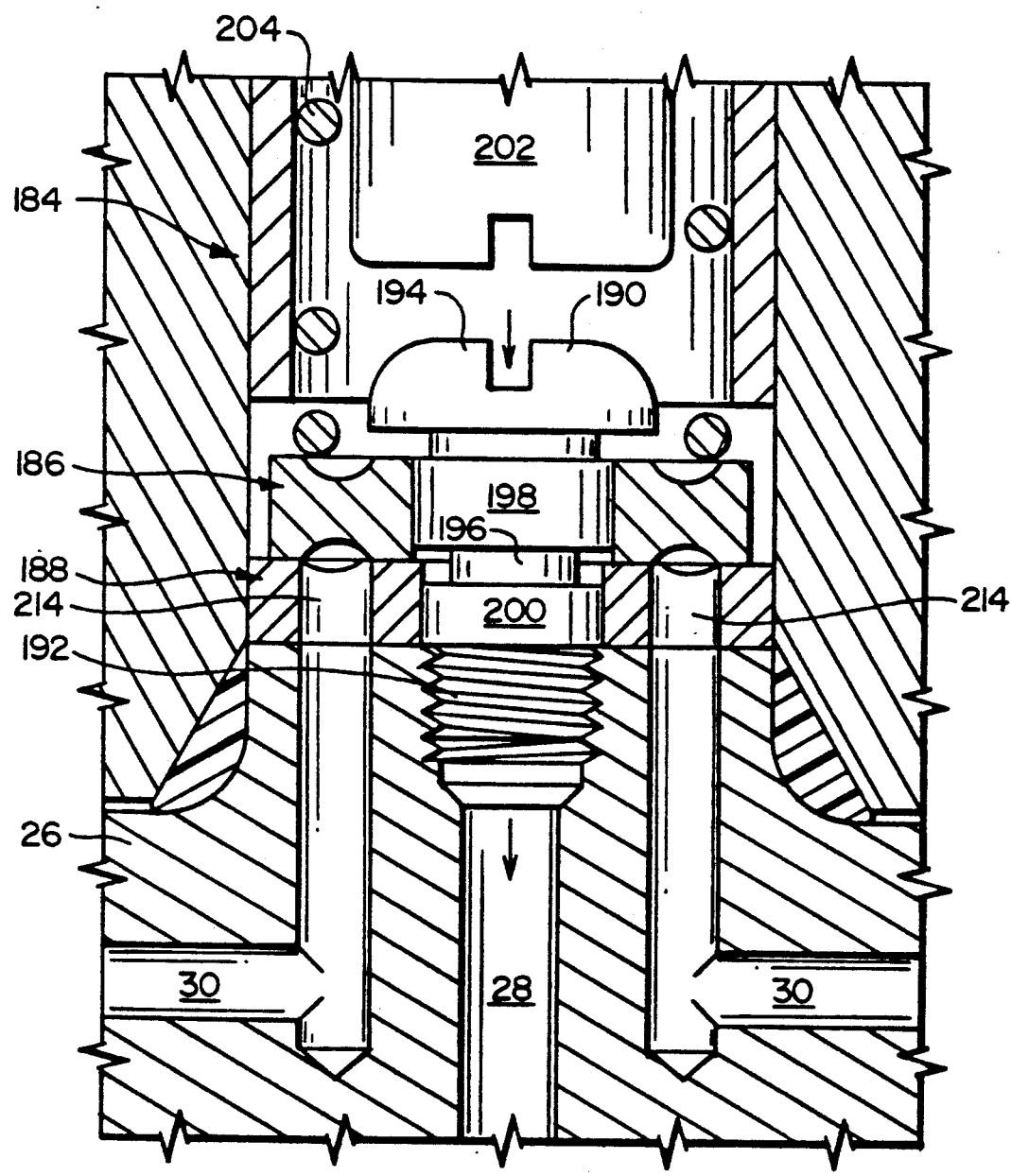
FIG. 9 is an enlarged sectional view of the inlet valve assembly of FIG. 8, this showing the doughnut-shaped poppet element and seat in sealing abutment.

FIG. 9 shows the poppet element and seat in enlarged detail, and also the limit screw 190 which passes through the center of these. This limit screw (which is similar to those used with conventional inlet poppet valves having solid poppet elements) has a threaded lower end 192 which engages the end of the valve body, and a relatively broad head portion 194. This head portion extends outwardly from the shank 196 of the screw and provides a stop to limit motion of the poppet element as this is lifted off of the valve seat. The shank of the limit screw passes through the central openings of the doughnut-shaped element and seat, and there are cylindrical bearing hubs 198 and 200 along the length of the shank which slidingly engage the cylindrical inner surfaces of the element and seat. The limit screw is provided with a central bore (not shown), and this is continuous with the outlet passage 28 so that high pressure fluid discharged from pumping cylinder 202 flows through this into passage 28. A compression spring 204 bears against the upper side of the poppet element 186 so as to bias this toward seat 188.

As noted above, conventional poppet valve assemblies using solid poppet elements have been employed in this role. However, for the same reasons as discussed above, excessive wear has been encountered due to the extreme pressure differentials involved (40,000 PSI–60 PSI). This problem was compounded when it was found desirable to cut a relief groove in the mating surface of the valve seat in order to increase contact pressures, since this increased the tendency of the seat to deform during operation. This problem has been overcome in the present invention by forming an annular recess in the mating surface of the poppet element, so that the annular wall areas which are formed adjacent this groove are displaced in concert with the wall areas of the seat so as to eliminate relative movement between the mating surfaces of these parts.

Figure 10A:
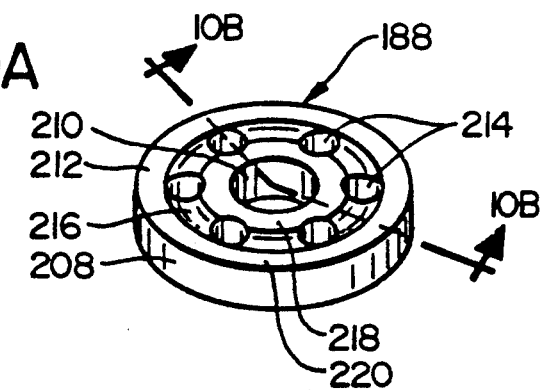
FIG. 10A is a perspective view of the seat and element of FIG. 9, showing the radial array of flow passages in the seat.
Figure 10B:
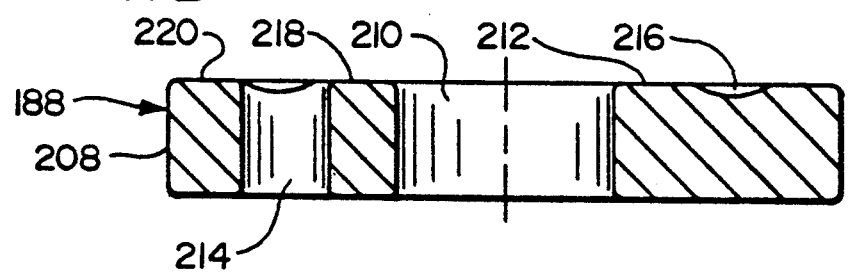
FIG. 10B is a sectional view of the seat element of FIG. 10A, taken along line 10B—10B.
Figure 11A:
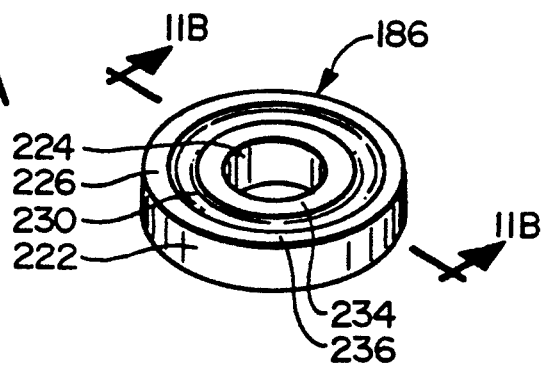
FIG. 11A is a perspective view of the poppet element of FIG. 9, this showing the annular recess therein.
Figure 11B:
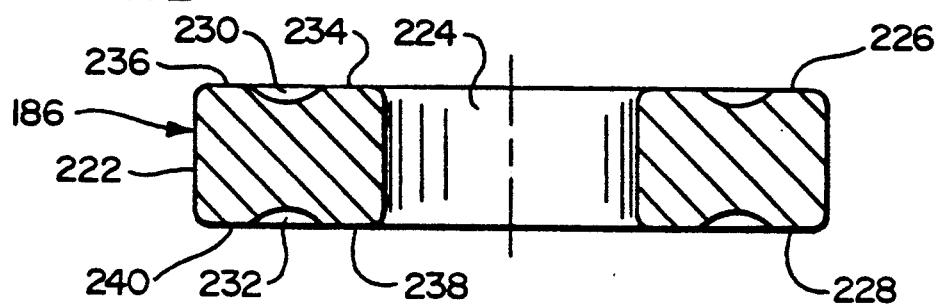
FIG. 11B is a sectional view of the poppet element of FIG. 11A, taken along line 11B—11B.

FIGS. 10–11 show these elements in greater detail. Firstly, FIGS. 10A–10B show the doughnut-shaped valve seat 188. This has a generally cylindrical outer surface 208, and a central bore 210 through which the limit screw extends. The upper end of the seat forms generally planar mating surface 212. This is penetrated by a series of flow passages 214 which extend vertically through the seat so as to communicate with the inlet passages in the valve body, there being six of these in the embodiment which is illustrated. The flow passages are arranged in a radial array about the central bore, preferably about midway between the bore and outer wall of the seat. The upper openings of the flow passages are interconnected by the circular relief groove 216 which is cut into the mating surface to increase the contact pressure with the poppet element, this having a shallow, U-shaped cross section and a width roughly corresponding to the diameters of the flow passages. Accordingly, it can be seen that inner and outer wall portions 218, 220 are formed essentially adjacent each flow passage, and that the upper ends of these wall portions are further weakened against compressive forces by the relief groove. This arrangement is thus analogous to the flow passage and annular wall of the single-passage valve seat 108 discussed above, and it will therefore be understood that wall portions 218, 220 are similarly subject to cyclical inward and outward deformation as the pump operates.

The poppet element 186, in turn, is shown in FIG. 11A. As with the valve seat, this is doughnut-shaped, and is provided with a cylindrical outer wall 222, and a cylindrical central bore 224 for the limit screw. There are two identical mating surfaces 226, 228, on the upper and lower ends of the element respectively, making it possible for the element to be installed either way during assembly or repairs. An annular recess 230, 232 is formed in each of these mating surfaces: these are preferably located approximately midway between the inner bore and outer wall of the poppet element so as to correspond to the relief groove in the seat. In the embodiment which is illustrated, each of these recesses is formed as a shallow, U-shaped groove, and these are configured to register in vertical alignment with the flow passages and annular recess in the underlying seat element. The annular recesses are analogous to the single central recess 132 of the poppet element described above, and so inner and outer annular wall portions 234, 236 and 238, 240 are formed adjacent each of the recesses; accordingly, the annular recesses are each configured so that these wall portions deform inwardly and outwardly in concert with the wall portions of the underlying seat during the operation of the pump, thus minimizing or eliminating relative movement between the mating surfaces of these components.

An exemplary embodiment of inlet poppet valve having a poppet element and seat constructed as shown in FIGS. 8-12 and configured to operate at an inlet pressure of about 60 PSI and a discharge pressure of above 40,000 PSI has the following relevant dimensions:

| INLET SEAT | |
|---|---|
| Outside Diameter | 1.185" |
| Inside Diameter | .385" |
| Overall Height | .200" |
| Number of Inlet Passages | 6 - spaced equally at 60 degrees |
| Diameter of Flow passages | .156" |
| Width of Annular Groove | .802" |
| Depth of Groove | .019" |
| Radius of Groove | .125" SR |
| POPPET ELEMENT | |
| Outside Diameter | 1.120" |
| Inside Diameter | .446" |
| Overall Height | .240" |
| Width of Annular Recesses | .802" |
| Depth of Recesses | .029" |
| Radius of Recesses | .093" SR |

The materials and heat treatment of these components were substantially the same as for the components of the outlet poppet valve assembly described above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A low-wear poppet assembly for a check valve which prevents reverse flow of a fluid from a high pressure zone to a low pressure zone in a reciprocating pump, said poppet assembly comprising:

a valve seat having an upper mating surface and at least one flow passage for said fluid, said flow passage being bordered by a wall portion of said seat, said flow passage being in communication with said low pressure zone and an outer surface of said wall portion being in communication with said high pressure zone so that said wall portion is displaced inwardly a predetermined amount in response to a pressure differential developed between said zones by said reciprocating pump; and a poppet element having a lower mating surface configured to sealingly abut said mating surface of said seat so as to prevent said reverse flow of said fluid, said poppet element having a recess extending inwardly from said lower mating surface and being bordered by a wall portion of said element, said recess being continuous with said flow passage in said seat when said element and seat are in abutment so that said recess is in communication with said low pressure zone, and an outer surface of said wall portion of said element being in communication with said high pressure zone so that said wall portion of said element is displaced inwardly a predetermined amount in response to said pressure differential;

said recess being configured so that said predetermined amount which said wall portion of said poppet element is displaced inwardly is approximately equal to said predetermined amount which said wall portion of said seat is displaced inwardly where said element and seat meet, so as to minimize relative movement between said mating surfaces when said surfaces are in sealing abutment with one another.

2. The poppet assembly of claim 1, wherein said valve seat has a single said flow passage, and said poppet element has a corresponding single said recess aligned with said flow passage.

3. The poppet assembly of claim 2, wherein said outer surface of said poppet element is substantially cylindrical, and said recess has a substantially circular mouth opening at said lower mating surface so that said lower mating surface extends annularly about said mouth opening.

4. The poppet assembly of claim 3, wherein said outer surface of said seat is substantially cylindrical, and said flow passage is a substantially cylindrical bore having a circular opening at said upper mating surface so that said upper mating surface extends annularly about said opening.

5. The poppet assembly of claim 3, wherein said recess has an upper end which is closed by a domed internal surface of said element so as to prevent concentration of stress along said internal surface as said wall portion of said element is displaced inwardly.

6. The poppet assembly of claim 5, wherein said domed internal surface of said poppet element is substantially hemispherical in shape.

7. The poppet assembly of claim 5, wherein said recess in said poppet element has a cylindrical lower portion which extends from said domed internal surface downwardly to said lower mating surface.

8. The poppet assembly of claim 4, wherein said recess in said poppet element is aligned substantially coaxially with said flow passage in said valve seat.

9. The poppet assembly of claim 1, wherein said valve seat has a plurality of said flow passages, and said recess in said poppet element is configured to be in communication with each of said flow passages when said element and seat are in sealing abutment.

10. The poppet assembly of claim 9, wherein said valve seat is a doughnut-shaped member having a central opening for receiving a shank of a limit screw, said plurality of flow passages being arranged in a radial array about said central opening.

11. The poppet assembly of claim 10, wherein said poppet element is a corresponding doughnut-shaped member having a central opening for receiving said shank of said limit screw, said recess in said mating surface of said poppet element extending annularly about said central opening so as to be in alignment with said radial array of flow passages in said seat.

12. The poppet assembly of claim 11, wherein said recess in said poppet element is an annular groove formed in said mating surface of said element.

13. The poppet assembly of claim 12, wherein said recess is U-shaped in cross-section.

14. The poppet assembly of claim 11, wherein said annular recess in said poppet element is formed approximately midway between said central opening and said outer surface thereof, so that annularly spaced inner and outer said wall portions of said poppet element of approximately equal thickness are formed adjacent said annular recess.

15. The poppet assembly of claim 11, wherein said valve seat is further provided with an annular groove formed in said upper mating surface for increasing contact pressure between said mating surfaces, said annular groove extending about said central opening in said seat so as to interconnect said array of flow passages, and so that inner and outer annular portions of said upper mating surface are formed adjacent said groove.

16. The poppet assembly of claim 15, wherein said poppet element and valve seat are configured so that said annular recess in said element and said groove in said seat are positioned in vertical alignment when said element and seat are in sealing abutment.

17. A method for minimizing wear of a poppet assembly of a check valve which prevents reverse flow of a fluid from a high pressure zone to a low pressure zone in a reciprocating pump, said method comprising the steps of:

providing a valve seat having an upper mating surface and at least one flow passage bordered by a wall portion of said seat, said flow passage being in communication with said low pressure zone and said wall portion having an outer surface which is in communication with said high pressure zone;

providing a poppet element having a lower mating surface configured to sealingly abut said mating surface of said seat so as to prevent said reverse flow of said fluid, said poppet element having a recess extending inwardly from said lower mating surface and being bordered by a wall portion of said poppet element, said recess being continuous with said flow passage when said element and seat are in abutment so that said recess is in communication with said low pressure zone, and an outer surface of said wall portion of said element being in communication with said high pressure zone;

reciprocating said pump so as to develop a pressure differential between said high and low pressure zones; and positioning said mating surfaces of said poppet element and said valve seat in sealing abutment so that said wall portions of said seat and element are each displaced inwardly by said pressure differential, said recess in said poppet element being configured so that said wall portion of said element is displaced inwardly by an amount which is approximately equal to an amount which said wall portion of said seat is displaced inwardly so as to minimize relative movement of said mating surfaces when in abutment with one another.

* * * * *